United States Patent
Eijkelkamp et al.

(10) Patent No.: US 11,979,074 B2
(45) Date of Patent: May 7, 2024

(54) WATERTIGHT AND STIFF MOTOR SUSPENSION

(71) Applicant: KONINKLIJKE PHILIPS N.V., Eindhoven (NL)

(72) Inventors: Marcus Franciscus Eijkelkamp, Peize (NL); René Van Den Berg, Drachten (NL); Michiel Allan Aurelius Schallig, Drachten (NL); Marcel Hilco Zijlstra, Leeuwarden (NL); Harold Wolf, Oranje (NL); Rob Roetert, Groningen (NL); Hendrik Klaas Haagsma, Hoogeveen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 277 days.

(21) Appl. No.: 17/629,901

(22) PCT Filed: Jul. 30, 2020

(86) PCT No.: PCT/EP2020/071452
§ 371 (c)(1),
(2) Date: Jan. 25, 2022

(87) PCT Pub. No.: WO2021/023603
PCT Pub. Date: Feb. 11, 2021

(65) Prior Publication Data
US 2022/0255392 A1    Aug. 11, 2022

(30) Foreign Application Priority Data
Aug. 6, 2019 (EP) .................................. 19190303

(51) Int. Cl.
*H02K 5/10* (2006.01)
*H02K 5/124* (2006.01)
*H02K 5/24* (2006.01)

(52) U.S. Cl.
CPC ............... *H02K 5/10* (2013.01); *H02K 5/124* (2013.01); *H02K 5/24* (2013.01)

(58) Field of Classification Search
CPC ............. H02K 5/10; H02K 5/124; H02K 5/24
See application file for complete search history.

(56) References Cited

U.S. PATENT DOCUMENTS 3,913,928 A * 10/1975 Yamaguchi ............. F16L 25/10
  277/615
4,631,825 A   12/1986 Kuriyama
(Continued)

FOREIGN PATENT DOCUMENTS

| CN | 201134714 Y | 10/2008 |
| CN | 202858906 U | 4/2013 |

(Continued)

OTHER PUBLICATIONS

International Search Report and Written Opinion dated Oct. 22, 2020 for International Application No. PCT/EP2020/071452 Filed Jul. 30, 2020.

*Primary Examiner* — Jue Zhang

(57) ABSTRACT

The invention relates to a motor suspension for rigid and watertight mounting of a motor to a housing of an electric device, an electric device comprising such a motor suspension and a hair cutting device comprising an electric device with such a motor suspension. The motor suspension comprises a motor fixation element, a sealing suspension element and a motor axis seal. The motor fixation element is configured to provide a rigid connection of a motor to a housing in one direction, while it provides some flexibility in another direction for not deforming the housing. The sealing suspension element is configured for providing a fluid-tight connection to the housing, and the motor axis seal (Continued)

is configured for providing a fluid tight connection of the sealing suspension element to a rotational axis of the motor.

14 Claims, 6 Drawing Sheets

(56) References Cited

U.S. PATENT DOCUMENTS

| | | | |
|---|---|---|---|
| 6,290,240 B1* | 9/2001 | Knapp | F16K 3/0227 |
| | | | 277/637 |
| 10,680,497 B2* | 6/2020 | Ploeger | H02K 5/18 |
| 2004/0010919 A1 | 1/2004 | Shiba | |
| 2015/0159788 A1* | 6/2015 | Sasinowski | F16L 21/035 |
| | | | 285/345 |

FOREIGN PATENT DOCUMENTS

| | | |
|---|---|---|
| CN | 102638122 B | 9/2014 |
| EP | 2045052 A1 | 4/2009 |
| EP | 2878827 A1 | 6/2015 |
| JP | S56129162 U | 10/1981 |
| JP | 2003071155 A | 3/2003 |
| JP | 2013122813 A | 6/2013 |
| JP | 2016195658 A | 11/2016 |
| KR | 20110125098 A | 11/2011 |
| WO | 2018198640 A1 | 11/2018 |

* cited by examiner

WATERTIGHT AND STIFF MOTOR SUSPENSION

CROSS REFERENCE TO RELATED APPLICATIONS

This application is the U.S. National Phase application under 35 U.S.C. § 371 of International Application No. PCT/EP2020/071452 filed Jul. 30, 2020, which claims the benefit of European Patent Application Number 19190303.8 filed Aug. 6, 2019. These applications are hereby incorporated by reference herein.

FIELD OF THE INVENTION

The present invention relates to a motor suspension for rigid and watertight mounting of a motor to a housing of an electric device, an electric device comprising a motor suspension for rigid and watertight mounting of a motor to a housing of the electric device, and a hair cutting device comprising an electric device comprising a motor suspension for rigid and watertight mounting of a motor to a housing of the electric device.

BACKGROUND OF THE INVENTION

In electric devices operating with a reciprocating movement of an element, for example a cutting element of a trimmer, a rotational movement of a motor output shaft is transformed into the reciprocating movement. Friction and forces acting against the reciprocating movement lead to forces onto the motor output shaft along the direction of the reciprocating movement. For the purpose of water tightness of the electric device and to shield internal components, a flexible seal can be placed between the rotating shaft of the motor and the housing of the electric device. Often one or more rubber seals are used to shield the internals of the device from water. The rubber seal is a part of the drive train stiffness. It is located between the housing to which the stationary part of the cutting element is connected, and the motor and/or motor axis to which the moving part of the cutting element is connected. Flexibility of the seal is needed to create the desired water tightness. Especially in cases where a rotating movement is transferred into a linear movement, such a seal can have a negative influence on how strong and well defined the linear movement under different load conditions is. Due to this flexibility of the seal, the construction of the drive train becomes less rigid, which results in a vibrational movement of the motor output shaft along the direction of the reciprocating movement. This might result in a loss of stroke of the reciprocating movement especially under high load conditions. Typical examples of such devices are hair cutting devices like beard trimmers and hair clippers, but also toothbrushes, kitchen tools such as mixers and electrical saws, and gardening or other tools such as hedge shears and saws can suffer from this drawback.

CN 202 858 906 U discloses a multistage dense seal structure of a churning machine with a first sealing ring and a second sealing ring.

CN 102 638 122 B discloses a driven shearing motor with a holder, a rotor unit, and two bearings.

In electrical appliances that have a moving function driven by a rotating axis and that need to be watertight, a solution is needed. For these reasons, it would be advantageous to have a motor suspension that does not suffer from the above-mentioned drawbacks.

SUMMARY OF THE INVENTION

It is an object of the present invention to provide a motor suspension for rigid and watertight mounting of a motor to a housing of an electric device with an improved performance.

The object of the present invention is solved by the subject matter of the independent claims, wherein further embodiments are incorporated in the dependent claims.

The described embodiments similarly pertain to the motor suspension for rigid and watertight mounting of a motor to a housing of an electric device, the electric device comprising a motor suspension for rigid and watertight mounting of a motor to a housing of the electric device, and the hair cutting device comprising an electric device comprising a motor suspension for rigid and watertight mounting of a motor to a housing of the electric device. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect of the invention, there is provided a motor suspension for rigid and watertight mounting of a motor to a housing of an electric device. The motor suspension comprises a motor fixation element to which a stator of a motor to be mounted is fixedly connectable, a sealing suspension element, and a motor axis seal. The sealing suspension element is configured for providing a fluid-tight connection of the sealing suspension element to a housing of an electric device. The motor axis seal has a first sealing surface which is fluid-tightly connected to the sealing suspension element, and the motor axis seal has a second sealing surface which is adapted for fluid-tightly receiving a rotational axis of the motor to be mounted. The rotational axis is configured for driving a reciprocating movement of a tool to be connected. The motor fixation element is configured for forming along at least a part of an outer circumferential surface of the motor fixation element a connection to an inner circumferential surface of the housing of the electric device that is rigid in a first direction substantially perpendicular to a direction of a longitudinal extension of the rotational axis and substantially parallel to a direction of the reciprocating movement. The rigid connection comprises a first connection section and a second connection section, wherein the first connection section and the second connection section are opposed to each other with respect to the rotational axis of the motor to be mounted.

The motor suspension comprises a motor fixation element, a sealing suspension element and a motor axis seal. The motor fixation element is connected to the motor, and it provides a rigid connection of the motor fixation element to a housing of the electric device in a direction perpendicular to the rotational axis. The motor fixation element and the motor can be inserted into the housing of the electric device, such that a part of the outer circumferential surface of the motor fixation element forms with a part of an inner circumferential surface of the housing of the electric device the rigid connection. The sealing suspension element provides a fluid-tight connection to the housing of the electric device. Further, the sealing suspension element is fluid-tightly connected to a first sealing surface of the motor axis seal, and a second sealing surface of the motor axis seal is fluid-tightly connected to a rotational axis of the motor.

The motor fixation element can be connected to the motor to prevent relative rotation of the motor and the motor fixation element around an axis parallel to the rotational axis, e.g. by one or more screws or protrusions that fit into screw holes of the motor. Further, the motor fixation element provides the rigid connection of the motor to the housing at least in the first direction. This first direction may be the direction of a reciprocating movement of a cutting tool being drivingly connected to the rotational axis and can be substantially perpendicular to the rotational axis and substantially parallel to the direction of the reciprocating movement. Substantially perpendicular or substantially parallel shall be understood as comprising a deviation of up to fifteen degrees in any direction.

The sealing suspension element together with the motor axis seal provides a fluid-tight enclosure of the motor in the housing and ensures fluid-tightness between the motor axis and the housing, with the rotational axis of the motor extending out from the motor axis seal. The sealing suspension element and the housing can be two separate parts fluid-tightly connected with a housing seal. However, the sealing suspension element and the housing can also be integrated as one single part.

The stiff connection between the motor fixation element and the housing can be enabled via at least two connection sections at opposite sides of the motor fixation element. The connection section can be located at an outer circumferential surface of the motor fixation element in a manner that the rotational axis of the motor is perpendicular to a line between the first and the second connection section. The first direction, in which the rigid connection is provided, is perpendicular to the line between the first and second connection section and perpendicular to the rotational axis.

In an embodiment of the invention, the motor fixation element has a form of a plate perpendicular to the rotational axis of the motor to be mounted and comprises at least one through slot transverse to a line between one of the first and second connection sections and the rotational axis of the motor to be mounted for enabling an elastic connection between the motor to be mounted to the motor fixation element and the housing of the electric device in the direction substantially perpendicular to the direction of the longitudinal extension of the rotational axis and substantially perpendicular to the direction of the reciprocating movement.

The motor fixation element can have the shape of a plate extending perpendicular to the rotational axis. Two through slots parallel to the first direction and located between the rotational axis of the motor and the connection section on either side of the rotational axis, respectively, provide some flexibility of the motor fixation element in the direction of the line from the first to the second connection section. Thus, the motor can be mounted flexible to the housing in the direction perpendicular to the reciprocating movement of the cutting tool and perpendicular to the rotational axis, while the connection may be rigid in the first direction of the reciprocating movement of the cutting tool. This flexibility ensures that there is a good fit at the at least two connection sections between the motor fixation element and the housing, such that the connection is rigid in the first direction, while the motor fixation element does not exert too much pressure on the housing such that the housing is deformed. Excessive pressure on the housing might deform the housing and deteriorate the fluid-tightness of the connection of the sealing suspension element to the housing. By avoiding this deformation, fluid-tightness can be improved.

In an embodiment of the invention, the motor fixation element comprises at least one recess or protrusion, respectively, being configured for tightly accommodating an opposing protrusion or recess, respectively, of the housing of the electric device, wherein the at least one recess tightly accommodating the respective protrusion forms along at least a part of the outer circumferential surface of the motor fixation element at least a part of the rigid connection to an inner circumferential surface of the housing of the electric device.

The rigid connection of the motor fixation element to the housing can be effected by at least on connection section. The outer circumferential surface of the motor fixation element can be connected to the inner circumferential surface of the housing. This connection can be effected by a recess accommodating a protrusion. This protrusion can extend into the recess thereby forming a rigid connection in one direction while leaving some flexibility in another direction. The recess can be located in the motor fixation element, and the protrusion can be located at the housing, or the recess can be located at the housing, and the protrusion can be located at the motor fixation element.

In an embodiment of the invention, the motor fixation element comprises at least two recesses symmetrically distributed along the outer circumferential surface for accommodating respective protrusions of the housing of the electric device.

Two recesses can be located at opposite sides of the outer circumferential surface of the motor fixation element. Protrusions of the outer circumferential surface of the housing are accommodated in these recesses.

In an embodiment of the invention, at least one of the protrusions and the recesses have inclined surfaces for self-centering the respective accommodating recesses and protrusions.

The recesses of the motor fixation element and the protrusions of the housing can have a trapezoidal or triangular shape. In this embodiment of the invention, the inclined surfaces of the trapeze or triangle can lead to a self-centering of the protrusion in the recess in combination with the flexibility of the motor fixation element in the direction of the line between the first and second fixation section. This ensures that there is a good fit without clearance at the at least two connection sections without putting too much pressure on the housing that the housing deforms and pressure is released from the fluid-tight sealing.

In an embodiment of the invention, the sealing suspension element has a sealing surface for a housing seal, wherein the motor suspension further comprises a housing seal, wherein the housing seal is adapted for providing the fluid-tight connection of the sealing suspension element to the housing of the electric device.

The fluid-tight sealing of the sealing suspension element is achieved by a housing seal, which is located between a sealing surface of the sealing suspension element and an inner circumferential surface of the housing.

In an embodiment of the invention, the sealing surface of the sealing suspension element is an outer circumferential sealing surface, wherein the housing seal is an O-ring being compressible between the outer circumferential sealing surface of the sealing suspension element and a corresponding inner circumferential surface of the housing.

The sealing surface of the sealing suspension element can be on an outer circumferential surface of the sealing suspension element. Thus, the sealing surface is in this embodiment of the invention opposite to the inner circumferential surface of the housing, and an O-Ring as housing seal can be compressed between the sealing suspension element and the housing.

In an embodiment of the invention, the outer circumferential sealing surface of the sealing suspension element has an oval shape having a continuously convex shaped outer circumference for uniform compression of the O-ring to a correspondingly concave shaped inner circumferential surface of the housing of the electric device.

The outer circumferential sealing surface of the sealing suspension element can have a continuously convex shape, such that a curvature has always the same direction, without any edges or straight sections. The inner circumferential surface of the housing can have a corresponding continuously concave shape, such that in this embodiment of the invention the O-Ring can be uniformly compressed between the convex surface of the sealing suspension element and the concave surface of the housing.

In an embodiment of the invention, the motor axis seal comprises opposed to the first sealing surface an abutting surface for receiving the motor fixation element, wherein the motor axis seal is compressed and thereby fixed between the sealing suspension element and the motor fixation element.

The motor axis seal can be fixed and connected to the sealing suspension element by being compressed between the sealing suspension element and the motor fixation element.

In an embodiment of the invention, the motor suspension is configured for providing a rigid connection of the motor to be mounted to the housing of the electric device in the first direction for enabling a transfer of a rotational movement of the rotational axis to a linear reciprocating movement with a reduced vibration of the motor in the housing in the first direction.

The linear reciprocating movement results in forces onto the rotational axis of the motor in the first direction parallel to the reciprocating movement. For avoiding vibrations of the rotational axis, the connection of the rotational axis to the housing has to be stiff with respect to the first direction. Thus, the rotational movement can be transformed to the reciprocating movement without a loss of stroke and without excessive loss of energy due to the vibration. The construction of this embodiment of the invention is such, that in the direction of movement in the first direction, the direction in which the highest forces can apply, there is a rigid connection between the rotational axis of the motor and the housing. In addition, in this embodiment of the invention, the connection of the motor fixation element to the housing does not apply any forces to the housing, which might lead to a deformation of the housing.

In an embodiment of the invention, the motor suspension is configured for providing a fluid-tight enclosure of the motor in the housing and for providing the rotational axis extending longitudinally out of the motor suspension and being translationally fixed against a translation in the first direction.

The motor suspension can provide a fluid-tight enclosure of the motor in the housing, thereby protecting electric components from damage caused by fluids. The rotational axis of the motor may extend through an orifice of the motor axis seal, while the motor axis seal may provide a fluid-tight connection to the rotational axis.

According to another aspect of the invention, there is provided an electric device comprising a motor suspension according to any of the preceding embodiments. The electric device comprises a motor having a stator and a rotational axis, wherein the stator of the motor is mounted to the motor fixation element and the rotational axis is fluid-tightly received by the second sealing surface of the motor axis seal.

The electric device can comprise a motor suspension as described in previous embodiments of the invention. The electric device further comprises a motor with a stator and a rotational axis. The motor can be mounted to the motor fixation element and thereby connected to the housing of the electric device, such that a rigid connection in the first direction is enabled.

In an embodiment of the invention, the motor fixation element and the through slot/slots formed therein have in the direction from a rotational axis to the respective connection sections a higher deformability than the housing of the electric device, such that transverse forces applied to the rotational axis of the motor to be mounted deform the motor fixation element rather than the inner circumferential surface of the housing.

The slots formed in the motor fixation element provide an elastic connection of the motor fixation element to the housing in the direction perpendicular to the first direction, which is defined by the reciprocating movement. However, the slots do not deteriorate the rigidity in the direction parallel to the first direction. Thus, a rigid connection in the first direction of the motor fixation element to the housing can be provided, while not deforming the housing of the electric device. Thus, the sealing suspension element can provide a fluid-tight connection to the housing, and the motor axis seal can provide a fluid-tight connection to the rotational axis of the motor in this embodiment of the invention.

According to another aspect of the invention, there is provided a hair cutting device comprising an electric device according to any of the preceding embodiments. The hair cutting device further comprises a cutting tool being drivingly connected to the rotational axis of the motor, wherein a main cutting direction of the cutting tool is transverse to a line connecting the opposing first and second connection sections.

Typical examples of watertight products having a reciprocating movement generated by a rotational axis of a motor are for example hair cutting devices like beard trimmers, hair clippers, or shaving devices, but also toothbrushes, kitchen tools such as mixers and electrical knives or saws, and gardening or medical tools, such as hedge shears and saws. They usually comprise a first part of a cutting tool performing a reciprocating movement, which is effected by a connection to the rotational axis of the motor. A second part of the cutting tool may be connected to the housing thereby causing a movement of the first part of the cutting tool relative to the second part of the cutting tool in the first direction. The motor can be mounted from the top side into the housing. Depending on form and function of the appliance, it can also be possible to mount the motor from the bottom side into the housing.

Additionally, it is possible to realize the motor suspension with a reduced number of components, such that the motor fixation element and the sealing suspension element are integrated into one part.

The benefits provided by any of the above aspects equally apply to all of the other aspects and vice versa.

In a gist, the invention relates to a motor suspension for rigid and watertight mounting of a motor to a housing of an electric device, an electric device comprising such a motor suspension and a hair cutting device comprising an electric device with such a motor suspension. The motor suspension comprises a motor fixation element, a sealing suspension element and a motor axis seal. The motor fixation element is configured to provide a rigid connection of a motor to a housing in one direction, while it provides some flexibility in another direction for not deforming the housing. The sealing suspension element is configured for providing a fluid-tight connection to the housing, and the motor axis seal is configured for providing a fluid tight connection of the sealing suspension element to a rotational axis of the motor.

The above aspects and embodiments will become apparent from and be elucidated with reference to the exemplary embodiments described hereinafter. Exemplary embodiments of the invention will be described in the following with reference to the following drawings:

DETAILED DESCRIPTION OF THE EMBODIMENTS

Figure 1:
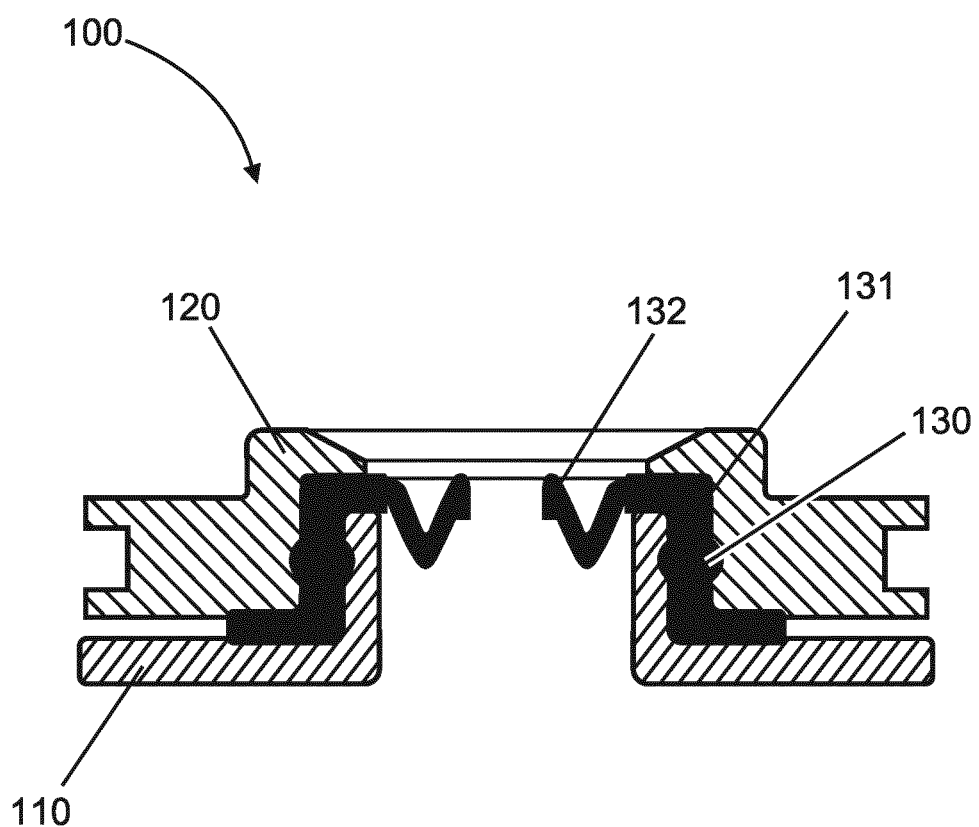
FIG. 1 shows a schematic set-up of a motor suspension for rigid and watertight mounting of a motor to a housing of an electric device according to a first exemplary embodiment of the invention.

FIG. 1 shows a schematic set-up of a motor suspension 100 for rigid and watertight mounting of a motor 160 to a housing 170 of an electric device 200 according to a first exemplary embodiment of the invention. The motor suspension 100 comprises a motor fixation element 110 connectable to a motor 160, a sealing suspension element 120 and a motor axis seal 130 with a first sealing surface 131 and a second sealing surface 132. The first sealing surface 131 is connected to the sealing suspension element 120, and the second sealing surface 132 is connectable to a rotational axis 161 of a motor 160. The motor 160 is connectable to the motor fixation element 110, which is configured for providing a rigid connection to a housing 170 in a first direction 140. The sealing suspension element 120 is configured for providing a fluid-tight connection to the housing 170.

Figure 2:
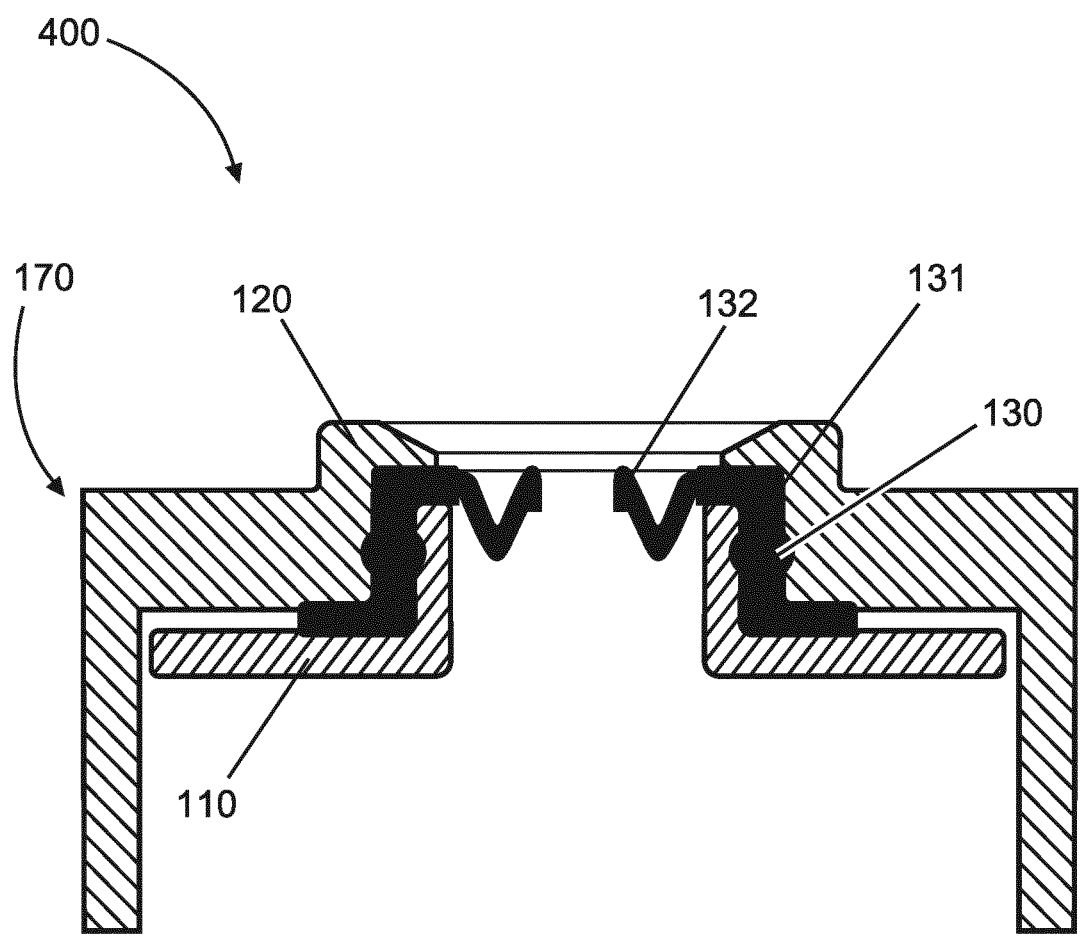
FIG. 2 shows a schematic set-up of a motor suspension for rigid and watertight mounting of a motor to a housing of an electric device according to a second exemplary embodiment of the invention.

FIG. 2 shows a schematic set-up of a motor suspension 400 for rigid and watertight mounting of a motor 160 to a housing 170 of an electric device 200 according to a second exemplary embodiment of the invention. In this embodiment of the invention, the sealing suspension element 120 is an integrated part of the housing 170.

Figure 3:
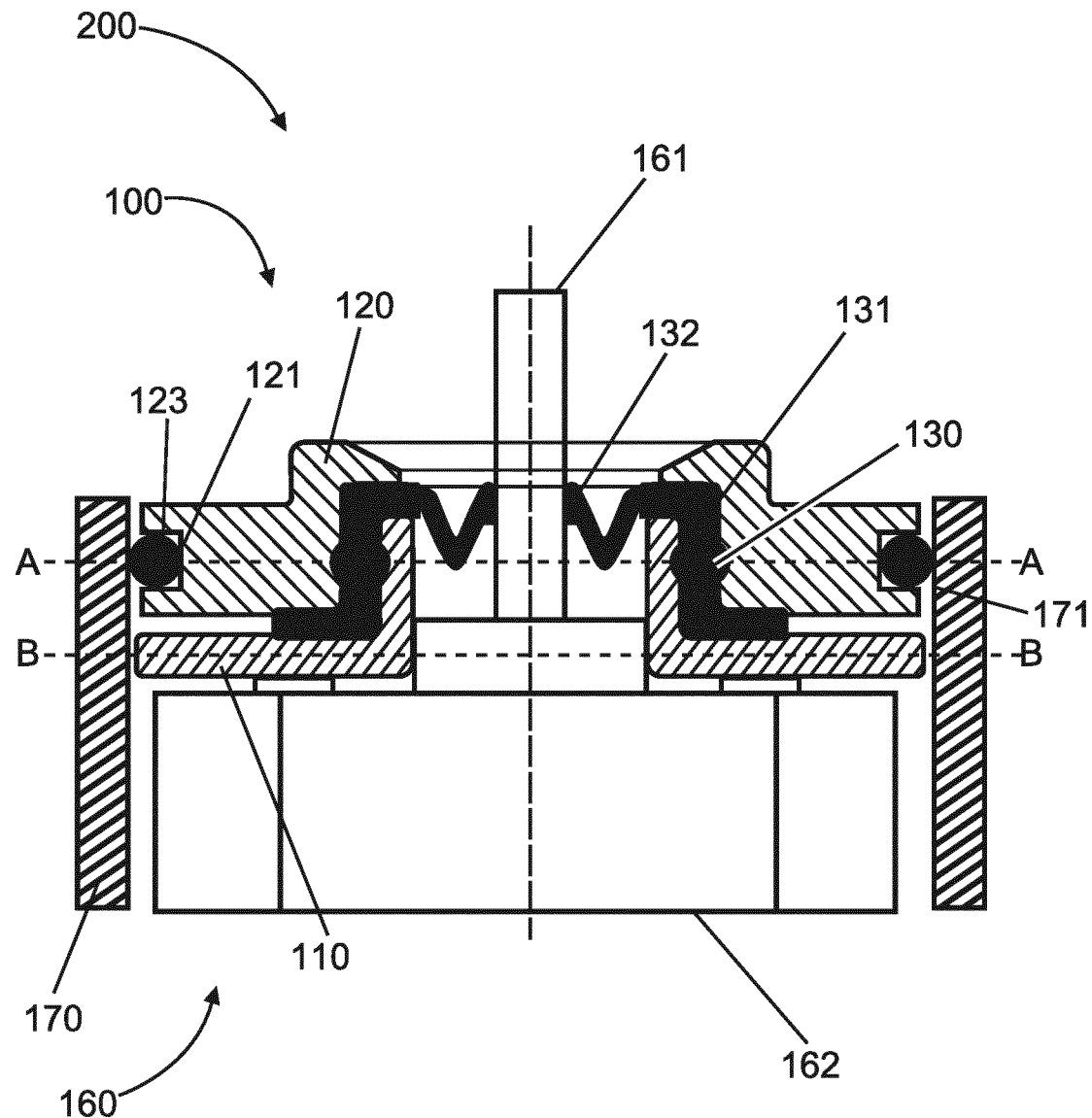
FIG. 3 shows a schematic set-up of an electric device comprising a motor suspension for rigid and watertight mounting of a motor to a housing of the electric device according to a third exemplary embodiment of the invention.

FIG. 3 shows a schematic set-up of an electric device 200 comprising a motor suspension 100 for rigid and watertight mounting of a motor 160 to a housing 170 of the electric device 200 according to a third exemplary embodiment of the invention. The stator 162 of the motor 160 is connected to the motor fixation element 110. The motor fixation element 110 provides a rigid connection in a direction perpendicular to the rotational axis 161 of the motor 160 to the housing 170 of the electric device 200. The rigid connection is formed along at least a part of an outer circumferential surface 111 of the motor fixation element 110 to an inner circumferential surface 171 of the housing 170 of the electric device. The sealing suspension element 120 is fluid-tightly connected to the housing with the housing seal (123) compressed between the sealing surface 121 of the sealing suspension element 120 and the inner circumferential surface 171 of the housing 170. A motor axis seal 130 is fluid-tightly connected with a first sealing surface 131 to the sealing suspension element 120, and with a second sealing surface 132 to the rotational axis 161 of the motor 160.

Figure 4:
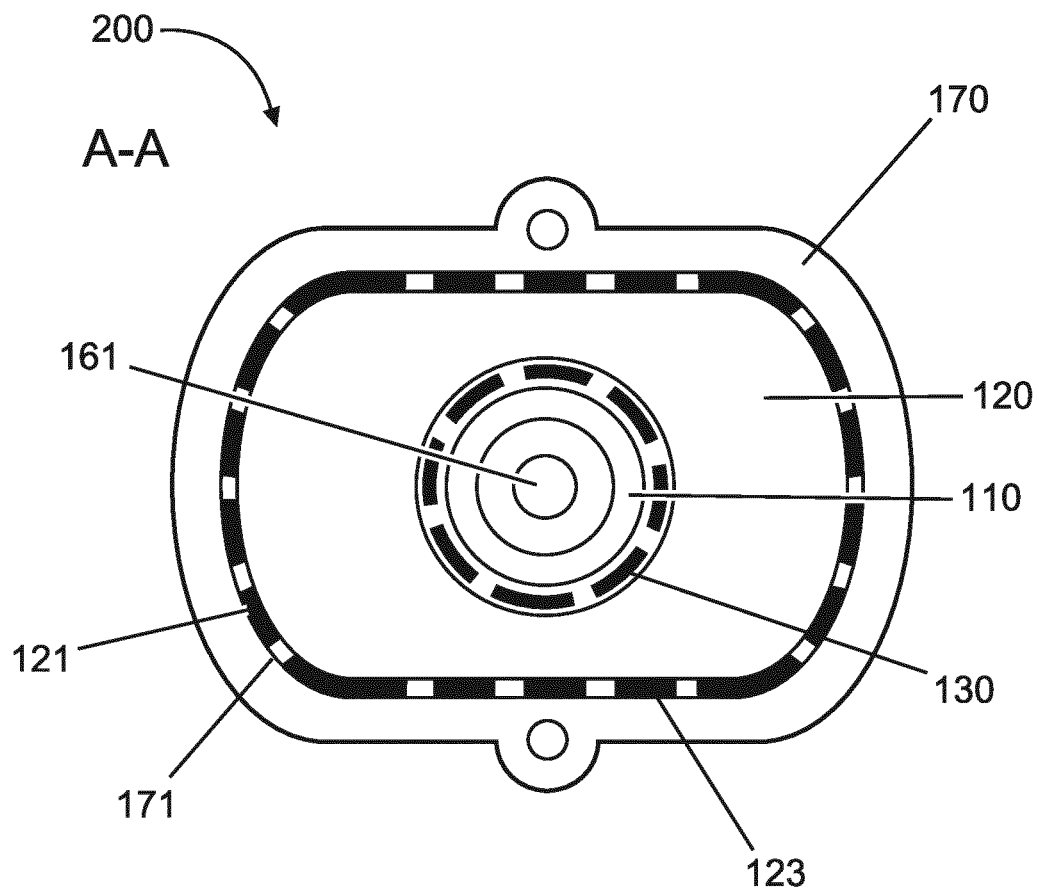
FIG. 4 shows a first sectional view of the electric device comprising a motor suspension for rigid and watertight mounting of a motor to a housing of the electric device according to the third exemplary embodiment of the invention.

FIG. 4 shows a first sectional view of the electric device 200 comprising a motor suspension 100 for rigid and watertight mounting of a motor 160 to a housing 170 of the electric device 200 according to the third exemplary embodiment of the invention. The level of the first sectional view is indicated in FIG. 3 with A-A. FIG. 4 shows the housing seal 123 being compressed between the sealing surface 121 of the sealing suspension element 120 and the inner circumferential surface 171 of the housing 170. Although not clearly depicted in the drawing, the sealing surface 121 and the inner circumferential surface 171 do not comprise straight sections, but have a convex and concave shape, respectively. The motor axis seal 130 is fixed between the sealing suspension element 120 and the motor fixation element 110. The rotational axis 161 of the motor 160 extends through an orifice of the motor axis seal 130.

Figure 5A:
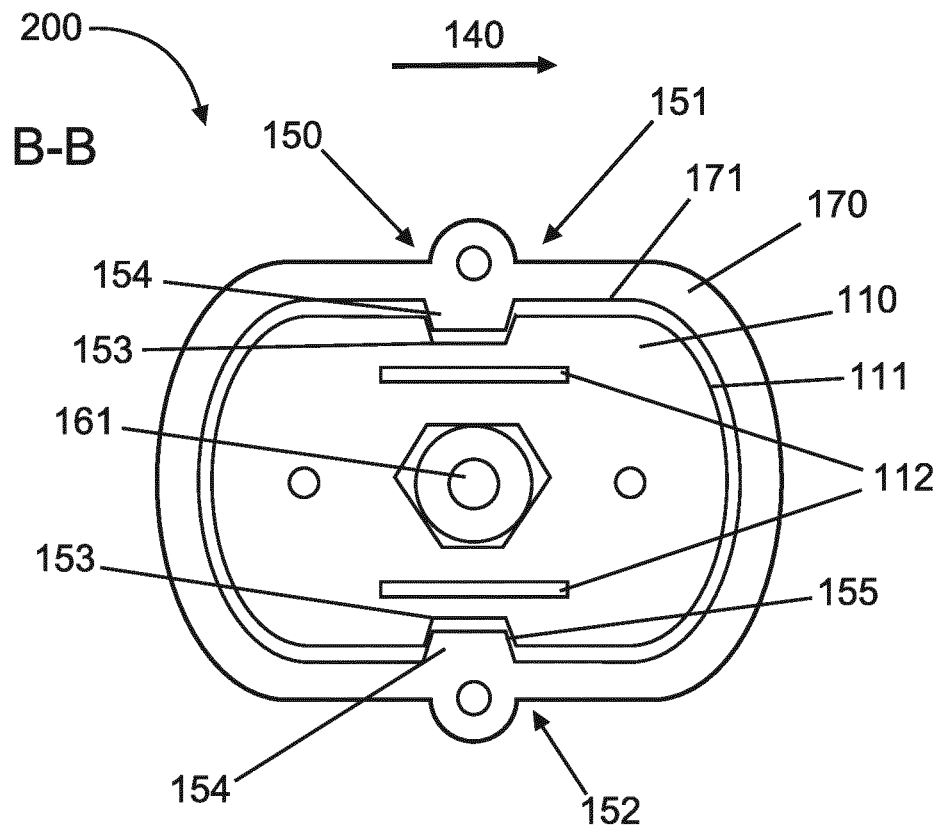
FIG. 5a shows a second sectional view of the electric device comprising a motor suspension for rigid and watertight mounting of a motor to a housing of the electric device according to the third exemplary embodiment of the invention.

FIG. 5a shows a second sectional view of the electric device 200 comprising a motor suspension 100 for rigid and watertight mounting of a motor 160 to a housing 170 of the electric device 200 according to the third exemplary embodiment of the invention. The level of the second sectional view is indicated in FIG. 3 with B-B. FIG. 5 shows the rigid connection 150 of the motor fixation element 110 to the housing 170 of the electric device 200. A first connection section 151 and a second connection section 152 are located on opposite sides of the outer circumferential surface 111 of the motor fixation element 110. At each connection section (151, 152), the motor fixation element 110 comprises a trapezoidal shaped recess 153 with inclined surfaces 155. These recesses 153 are accommodating corresponding protrusions 154 formed on the inner circumferential surface 171 of the housing 170 and thereby forming the rigid connection in the first direction 140. Two through slots 112 extending parallel to the first direction 140 and located between the rotational axis 161 of the motor 160 and the first connection section 151 and the second connection section 152, respectively, are formed in the motor fixation element 110. Thus, the recesses 153 are flexible and movable along the line from the first connection section 151 to the second connection section 152, and a rigid connection of the motor fixation element 110 to the housing 170 is provided without any deformation of the housing 170.

Figure 5B:
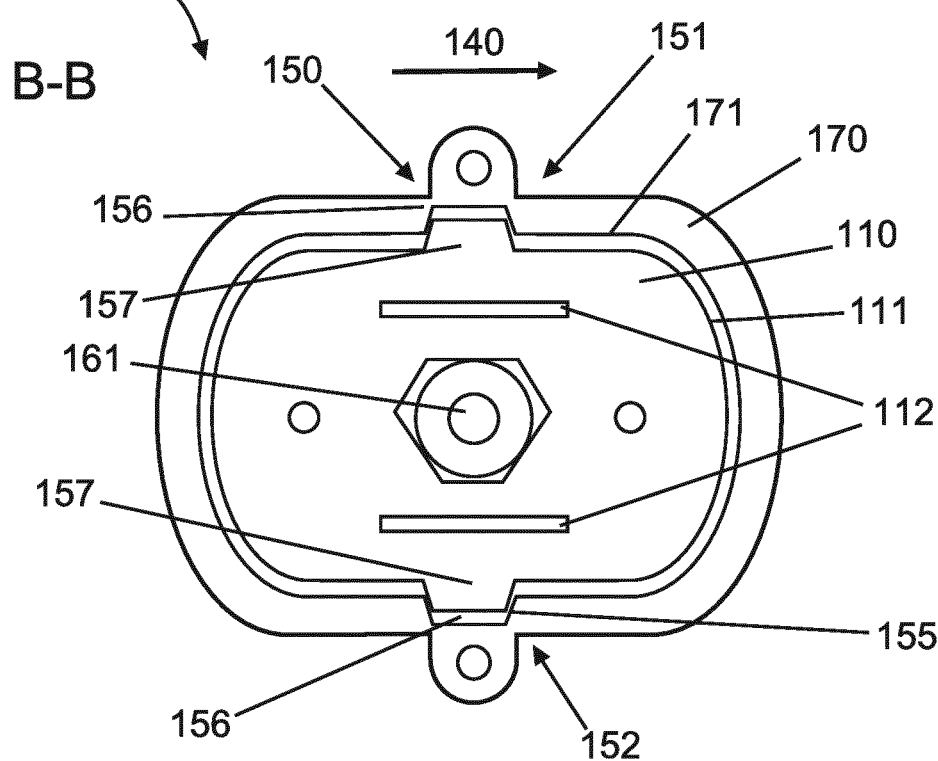
FIG. 5b shows a sectional view of the electric device comprising a motor suspension for rigid and watertight mounting of a motor to a housing of the electric device according to a fourth exemplary embodiment of the invention.

FIG. 5b shows a sectional view of the electric device 200 comprising a motor suspension 100 for rigid and watertight mounting of a motor 160 to a housing 170 of the electric device 200 according to a fourth exemplary embodiment of the invention. In contrast to FIG. 5a, FIG. 5b shows a protrusion 157 being positioned at the motor fixation element 110, and a recess 156 being positioned at the housing 170.

Figure 6:
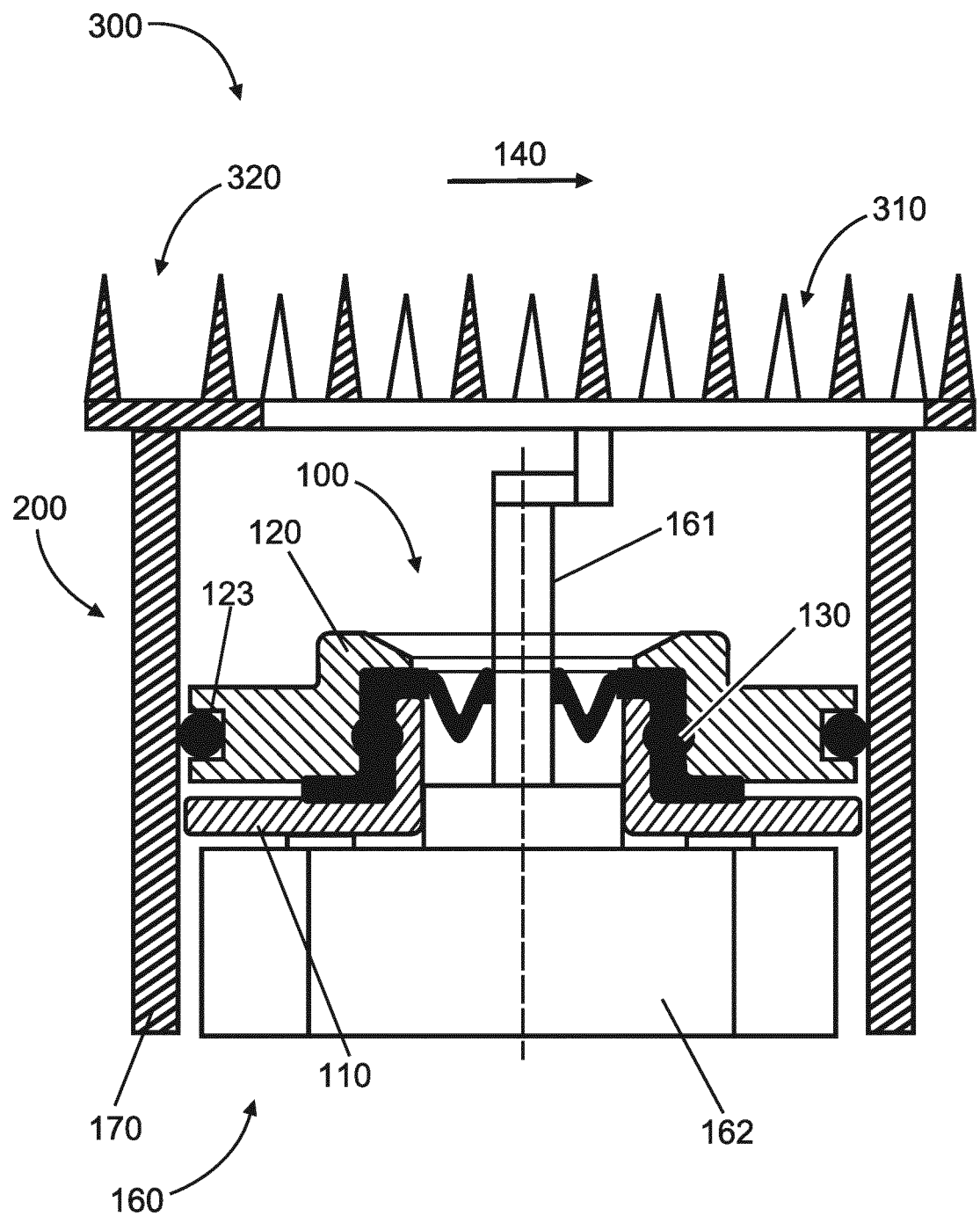
FIG. 6 shows a schematic set-up of a hair cutting device comprising an electric device comprising a motor suspension for rigid and watertight mounting of a motor to a housing of the electric device according to a fifth exemplary embodiment of the invention.

FIG. 6 shows a schematic set-up of a hair cutting device 300 comprising an electric device 200 comprising a motor suspension 100 for rigid and watertight mounting of a motor 160 to a housing 170 of the electric device 200 according to a fifth exemplary embodiment of the invention. The hair cutting device 300 further comprises a cutting tool 310 being drivingly connected to the rotational axis 161 of the motor 160 and a comb 320 being connected to the housing 170. The housing 170 may be integrated in a housing of a hair cutting device 300 and may extend beyond the sealing suspension element 120 and the rotational axis 161. A main cutting direction of the cutting tool 310 is parallel to the first direction 140.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

LIST OF REFERENCE SIGNS 100, 400 motor suspension
110 motor fixation element
111 outer circumferential surface
112 through slot
120 sealing suspension element
121 sealing surface
123 housing seal
130 motor axis seal
131 first sealing surface
132 second sealing surface
140 first direction
150 rigid connection
151 first connection section
152 second connection section
153 recess of the motor fixation element
154 protrusion of the housing
155 inclined surface
156 recess of the housing
157 protrusion of the motor fixation element
160 motor
161 rotational axis
162 stator
170 housing
171 inner circumferential surface
200 electric device
300 hair cutting device
310 cutting tool
320 comb

The invention claimed is:

1. A motor suspension for rigid and watertight mounting of a motor to a housing of an electric device the motor suspension comprising:
a motor fixation element to which a stator of a motor to be mounted is fixedly connectable,
a sealing suspension element, and
a motor axis seal;
wherein the sealing suspension element is configured for providing a fluid-tight connection of the sealing suspension element to the housing of the electric device;
wherein the motor axis seal has a first sealing surface which is fluid-tightly connected to the sealing suspension element,
wherein the motor axis seal has a second sealing surface which is adapted for fluid-tightly receiving a rotational axis of the motor to be mounted, wherein the rotational axis is configured for driving a reciprocating movement of a tool to be connected,
wherein the motor fixation element is configured for forming along at least a part of an outer circumferential surface of the motor fixation element a connection to an inner circumferential surface of the housing of the electric device that is rigid in a first direction substantially perpendicular to a direction of a longitudinal extension of the rotational axis and substantially parallel to a direction of the reciprocating movement,
wherein the rigid connection comprises a first connection section and a second connection section that are opposed to each other with respect to the rotational axis of the motor to be mounted.

2. The motor suspension according to claim 1, wherein the motor fixation element has a form of a plate perpendicular to the rotational axis of the motor to be mounted and comprises at least one through slot transverse to a line between one of the first and second connection sections and the rotational axis of the motor to be mounted for enabling an elastic connection between the motor to be mounted to the motor fixation element and the housing of the electric device a direction substantially perpendicular to the direction of the longitudinal extension of the rotational axis and substantially perpendicular to the direction of the reciprocating movement.

3. The motor suspension according to any of claim 1, wherein the motor fixation element comprises at least one recess or protrusion, respectively, being configured for tightly accommodating an opposing protrusion or recess, respectively, of the housing of the electric device, wherein the at least one recess tightly accommodating the respective protrusion forms along at least a part of the outer circumferential surface of the motor fixation element at least a part of the rigid connection to the inner circumferential surface of the housing of the electric device.

4. The motor suspension according to any of claim 1, wherein the motor fixation element comprises at least two recesses symmetrically distributed along the outer circumferential surface for accommodating respective protrusions of the housing of the electric device.

5. The motor suspension according to any of claim 3, wherein at least one of the at least one recess or protrusions, and the recesses have has an inclined surfaces for self-centering the respective accommodating opposing protrusion or recesses and protrusions.

6. The motor suspension according to claim 1, wherein the sealing suspension element has a sealing surface for a housing seal, wherein the motor suspension further comprises the housing seal, wherein the housing seal is adapted for providing the fluid-tight connection of the sealing suspension element to the housing of the electric device.

7. The motor suspension according to claim 6, wherein the sealing surface of the sealing suspension element is an outer circumferential sealing surface, wherein the housing seal is an O-ring being compressible between the outer circumferential sealing surface of the sealing suspension element and a corresponding inner circumferential surface of the housing.

8. The motor suspension according to claim 7, wherein the outer circumferential sealing surface of the sealing suspension element has an oval shape having a continuously convex shaped outer circumference for uniform compression of the O-ring to a correspondingly concave shaped inner circumferential surface of the housing of the electric device.

9. The motor suspension according to claim 1, wherein the motor axis seal comprises, opposed to the first sealing surface an abutting surface for receiving the motor fixation element, wherein the motor axis seal is compressed and thereby fixed between the sealing suspension element and the motor fixation element.

10. The motor suspension according to claim 1, wherein the motor suspension is configured for providing a rigid connection of the motor to be mounted to the housing of the electric device in the first direction for enabling a transfer of a rotational movement of the rotational axis to a linear reciprocating movement with a reduced vibration of the motor in the housing in the first direction.

11. The motor suspension according to claim 1, wherein the motor suspension is configured for providing a fluid-tight enclosure of the motor in the housing and for providing the rotational axis extending longitudinally out of the motor suspension and being translationally fixed against a translation in the first direction.

12. An electric device comprising a motor suspension according to claim 1, wherein the electric device comprises the motor having the stator connected thereto, wherein the stator of the motor is mounted to the motor fixation element and the rotational axis is fluid-tightly received by the second sealing surface of the motor axis seal.

13. The electric device according to claim 12, wherein the motor fixation element and the at least one through slot/slots formed therein haves, in the direction from the rotational axis to the respective first and second connection sections, a higher deformability than the housing of the electric device, such that transverse forces applied to the rotational axis of the motor to be mounted deform the motor fixation element rather than the inner circumferential surface of the housing.

14. A hair cutting device comprising an electric device according to claim 12, further comprising a cutting tool being drivingly connected to the rotational axis of the motor, wherein a main cutting direction of the cutting tool is transverse to a line connecting the opposing first and second connection sections.

* * * * *